(12) United States Patent
Raad et al.

(10) Patent No.: US 8,798,865 B1
(45) Date of Patent: Aug. 5, 2014

(54) PULL-DRIFT COMPENSATION ENHANCEMENTS

(71) Applicant: Ford Global Technologies, LLC, Dearborn, MI (US)

(72) Inventors: Joseph M. Raad, Farmington, MI (US); Daniel Tuttle, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 13/759,183

(22) Filed: Feb. 5, 2013

(51) Int. Cl.
*A01B 69/00* (2006.01)
*B62D 6/00* (2006.01)
*B62D 11/00* (2006.01)
*B62D 12/00* (2006.01)
*B63G 8/20* (2006.01)
*B63H 25/04* (2006.01)
*G05D 1/00* (2006.01)
*G06F 7/00* (2006.01)
*G06F 17/00* (2006.01)
*G06F 19/00* (2011.01)

(52) U.S. Cl.
CPC ...................................... *B62D 6/00* (2013.01)
USPC .................. 701/42; 701/36; 701/41; 340/939

(58) Field of Classification Search
USPC ............ 701/1, 36, 41, 42; 180/443, 446, 447; 340/465, 439; 188/350
See application file for complete search history.

(56) References Cited

U.S. PATENT DOCUMENTS

| | | |
|---|---|---|
| 4,509,611 A | 4/1985 | Kade et al. |
| 5,255,192 A | 10/1993 | Ito et al. |
| 5,528,497 A | 6/1996 | Yamamoto et al. |
| 5,703,775 A | 12/1997 | Yamamoto et al. |
| 5,765,116 A | 6/1998 | Wilson-Jones et al. |
| 5,774,819 A | 6/1998 | Yamamoto et al. |
| 5,913,375 A | 6/1999 | Nishikawa |
| 6,102,151 A | 8/2000 | Shimizu et al. |
| 6,474,436 B1 | 11/2002 | Konigorski |
| 6,564,125 B2 | 5/2003 | Pattok et al. |
| 6,640,923 B1 | 11/2003 | Dominke et al. |
| 6,965,820 B2 * | 11/2005 | Amberkar et al. ............. 701/41 |
| 7,406,374 B2 | 7/2008 | Ono et al. |

(Continued)

FOREIGN PATENT DOCUMENTS

DE 102006022663 A1 11/2007
WO WO-2008044010 A1 4/2008

OTHER PUBLICATIONS

Comfort and Convenience Features, <http://www.nexteer.com/technology/steering/torque-power-steerinq/comfort-and-convenience-features/>.

*Primary Examiner* — Rami Khatib
(74) *Attorney, Agent, or Firm* — Raymond Coppiellie; Ford Global Technologies, LLC

(57) ABSTRACT

A pull-drift compensation controller device for a vehicle configured to perform operations including identifying a current pull-drift compensation torque and a current driver input torque while in an adapt-and-compensate state in which pull-drift compensation torque is learned and applied, wherein the vehicle is moving at a substantially straight heading; and performing a transition from a normal pull-drift compensation adjustment sub-state of the adapt-and-compensate state to a fast pull-drift compensation adjustment sub-state of the adapt-and-compensate state based on the current driver torque opposing the direction of the current pull-drift compensation torque without a change in the heading.

18 Claims, 2 Drawing Sheets

(56) References Cited

U.S. PATENT DOCUMENTS

| | | |
|---|---|---|
| 7,668,635 B2 | 2/2010 | Raksincharoensak et al. |
| 7,725,227 B2 | 5/2010 | Pattok et al. |
| 8,083,021 B2 | 12/2011 | Reinelt et al. |
| 8,437,913 B2 * | 5/2013 | Wang et al. .................. 701/41 |
| 2003/0055543 A1 | 3/2003 | Amberkar et al. |
| 2005/0209752 A1 | 9/2005 | Ono et al. |
| 2008/0097670 A1 | 4/2008 | Ogawa et al. |
| 2010/0070135 A1 | 3/2010 | Wang et al. |
| 2010/0228443 A1 | 9/2010 | Junghanns |
| 2011/0029200 A1 | 2/2011 | Shah |

* cited by examiner

PULL-DRIFT COMPENSATION ENHANCEMENTS

BACKGROUND

When a vehicle is headed in a substantially straight-ahead direction, the driver may maintain a steering wheel of the vehicle in a centered neutral position. However, in some cases a driver may apply a small amount of force to the steering wheel to prevent the vehicle from pulling away from its substantially straight-ahead heading. This pulling or drifting sensation in the steering system may be causes by various factors, such as crowned roads or steady winds.

Pull-drift compensation is a software-based technology generally suitable for various power steering assist systems. A pull-drift compensation system may detect certain road conditions, such as a crowned road surface or a crosswind, by identifying a driver compensation consistently applied over a period of time or distance of straight ahead driving. Based on the identified driver compensation torque, the pull-drift compensation system may learn an amount of pull-drift compensation to automatically apply to the steering system. Once the pull-drift compensation learns an appropriate amount of force to apply, the system may apply the amount of force automatically using the power steering assist, thereby relieving the driver from continuing to apply a force to preserve a straight-ahead heading. Accordingly, pull-drift compensation may reduce a source of annoyance for many drivers faced with uneven roads or crosswinds.

SUMMARY

A pull-drift compensation controller device for a vehicle may be configured to perform operations including identifying a current pull-drift compensation torque and a current driver input torque while in an adapt-and-compensate state in which pull-drift compensation torque is learned and applied, wherein the vehicle is moving at a substantially straight heading; and performing a transition from a normal pull-drift compensation adjustment sub-state of the adapt-and-compensate state to a fast pull-drift compensation adjustment sub-state of the adapt-and-compensate state based on the current driver torque opposing the direction of the current pull-drift compensation torque without a change in the heading.

A method includes identifying a current pull-drift compensation torque and a current driver input torque while in an adapt-and-compensate state in a vehicle moving at a substantially straight heading; and performing, by the pull-drift compensation controller, a transition from a normal pull-drift compensation adjustment sub-state of the adapt-and-compensate state to a fast pull-drift compensation adjustment sub-state based on the current driver torque opposing the direction of the current pull-drift compensation torque without a heading change.

A pull-drift compensation controller device for a vehicle may be configured to perform operations comprising identifying a pull-drift compensation torque and a driver input torque opposing for a predetermined reset threshold; and performing, based on the pull-drift compensation torque and a driver input torque opposing for the predetermined reset threshold, a transition from a compensate-only state in which pull-drift compensation torque is applied but not learned to a reset state in which the pull-drift compensation torque is reset to a default value and neither learning nor applying pull-drift compensation torque is performed.

DETAILED DESCRIPTION

Present pull-drift compensation logic adapts slowly to road crown in order to reduce the driver's torque needed to maintain a straight heading. However, after the pull-drift compensation logic adapts for road crown, and the vehicle changes lanes to an opposite or lesser road crown, the pull-drift compensation torque may become opposed to the driver's torque input. This additional torque may feel unnatural and may be readily noticeable by a driver of the vehicle. Moreover, due to the relatively slow rate of adaptation of the pull-drift compensation logic, the unnatural opposing pull-drift compensation torque may persist longer than expected, resulting in driver complaints.

An enhanced pull-drift compensation system may utilize additional logic to monitor both pull-drift compensation torque and the driver's torque input. Based on at least these inputs, the enhanced pull-drift compensation logic may determine when the pull-drift compensation torque is in the same direction as driver input, and when the pull-drift compensation torque opposes the driver input. When the pull-drift compensation torque opposes driver input, the enhanced pull-drift compensation logic may transition to use of a relatively faster pull-drift compensation learning rate, or in some cases reset the pull-drift compensation torque to a default value such as zero. This may be done to allow the pull-drift compensation to more quickly adapt to the opposing pull-drift compensation torque, thereby reducing a transition time where pull-drift compensation torque opposes driver torque input. Moreover, when the pull-drift compensation torque is in the same direction as the driver input, the enhanced pull-drift compensation logic may likewise utilize a relatively slower normal pull-drift compensation learning rate.

By transitioning between these different pull-drift compensation learning rates, the enhanced pull-drift compensation system may accordingly provide pull-drift compensation, while also allowing for a more natural transition over varying road surfaces that is much less noticeable to the driver. Thus, the enhanced pull-drift compensation system may speed up torque compensation during road crown direction changes or crosswind changes as well as reduce the time during which a driver is opposing a previously-learned pull-drift compensation torque.

Figure 1:
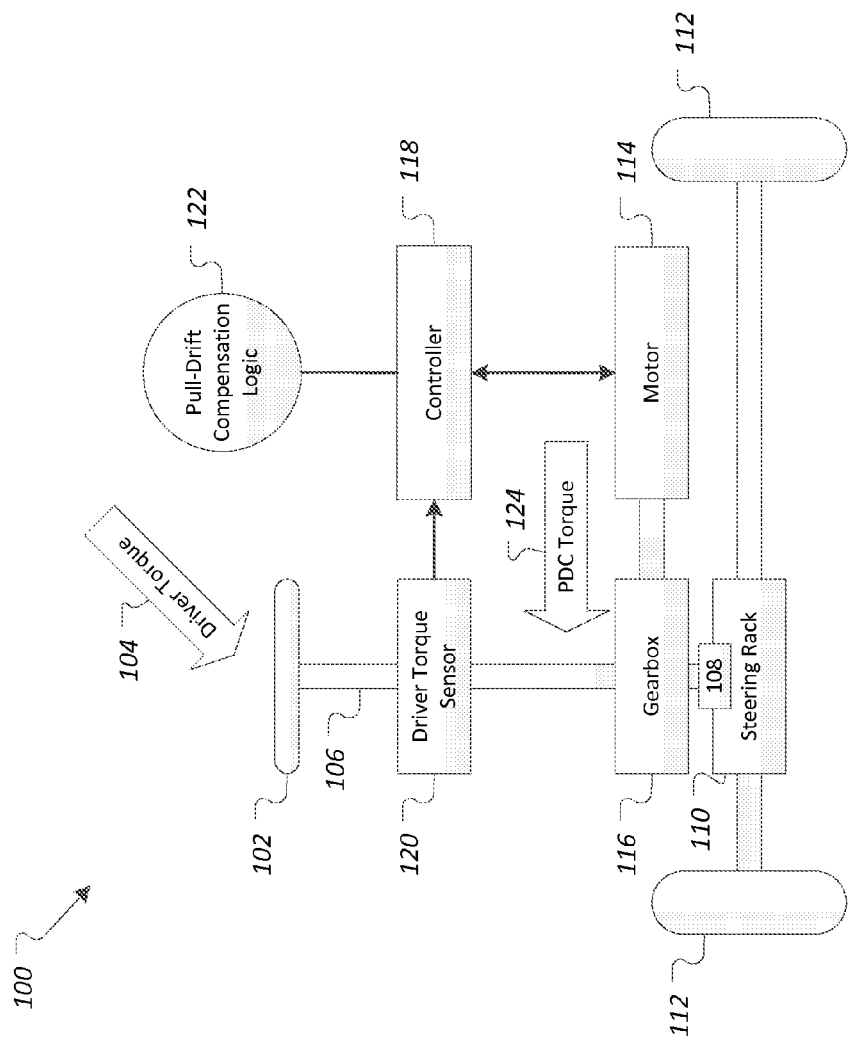
FIG. 1 illustrates an exemplary power steering system for performing enhanced pull-drift compensation.

FIG. 1 illustrates an exemplary power steering system 100 for performing enhanced pull-drift compensation. The system 100 may include a steering wheel 102 designed to receive driver torque 104 input from a driver of a vehicle. A steering shaft 106 may be attached to the steering wheel 102 on one end and to a steering pinion 108 on the other end. The steering pinion 108 may be in engagement with a steering rack 110 coupled at each end to wheels 112 of the vehicle. Rotation of the steering wheel 102 may transport the driver torque 104 input via the steering shaft 106 to cause rotation of the steering pinion 108, which in turn may cause a translation of the steering rack 110, thereby causing the wheels 112 to rotate about a substantially vertically oriented axis to change the direction of the vehicle.

The power steering system 100 may further include a motor 114 configured to selectively provide servo or power assistance steering boost to augment the driver torque 104 input received from the driver. The motor 114 may be selectively coupled to the steering system by way of a gearbox 116 including steering assist gearing and optionally a clutch (not shown). Control of the motor 114 may be effected by a controller 118 configured to receive various inputs, such as an indication of driver torque 104 from a driver torque sensor 120. The driver torque sensor 120 may measure driver input through various mechanisms, such as optically or inductively. Based on the driver torque 104, the controller 118 may be configured to control the motor 114 to provide an appropriate amount of steering boost. While the exemplary power steering system 100 is described as including a motor 114 and gearbox 116, it should be noted that the techniques discussed herein are applicable to various types of power assist systems, including hydraulic assistance (HPAS), electro-hydraulic assistance (EHPAS) or electro-mechanical assistance (EPAS) systems.

The controller 118 may be further configured to utilize pull-drift compensation logic 122 to implement pull-drift compensation functionality in the power steering system 100. The pull-drift compensation logic 122 may determine a straight-ahead driving condition of the vehicle to identify whether pull-drift compensation should be active. For example, the pull-drift compensation logic 122 may compare a current indication of driver torque 104 from a driver torque sensor 120 to a minimum limit value of driver torque 104 to determine whether or not the current driver torque 104 exceeds the minimum limit value. When it is determined that the vehicle is moving at a substantially straight heading, the pull-drift compensation logic 122 may be configured to, based on the indication of driver torque 104, determine a pull-drift compensation torque 124 to apply to reduce the amount of driver torque 104 needed to maintain the straight heading. For example, pull-drift compensation logic 122 may be configured to adjust the amount of pull-drift compensation torque 124 only after the driver torque 104 has been consistently applied for a predetermined period of time or distance, such as for one minute or a quarter mile as some possible examples. Based on the pull-drift compensation logic 122, the controller 118 may be configured to direct the motor 114 to provide the learned amount of pull-drift compensation torque 124 to the steering system 100.

Pull-drift compensation may be useful to relieve a driver from providing driver torque 104 over crowned road surfaces or in crosswind conditions. However, these conditions may change over time, even without a change in vehicle heading. As some examples, the crown of a road may lessen, or an amount of wind may suddenly die down. In these and other examples, the pull-drift compensation torque 124 may no longer be desired, and in fact may run counter to the driver torque 104 input, resulting in driver complaints. An enhanced pull-drift compensation logic 122 may be implemented to address these issues with pull-drift compensation.

Figure 2:
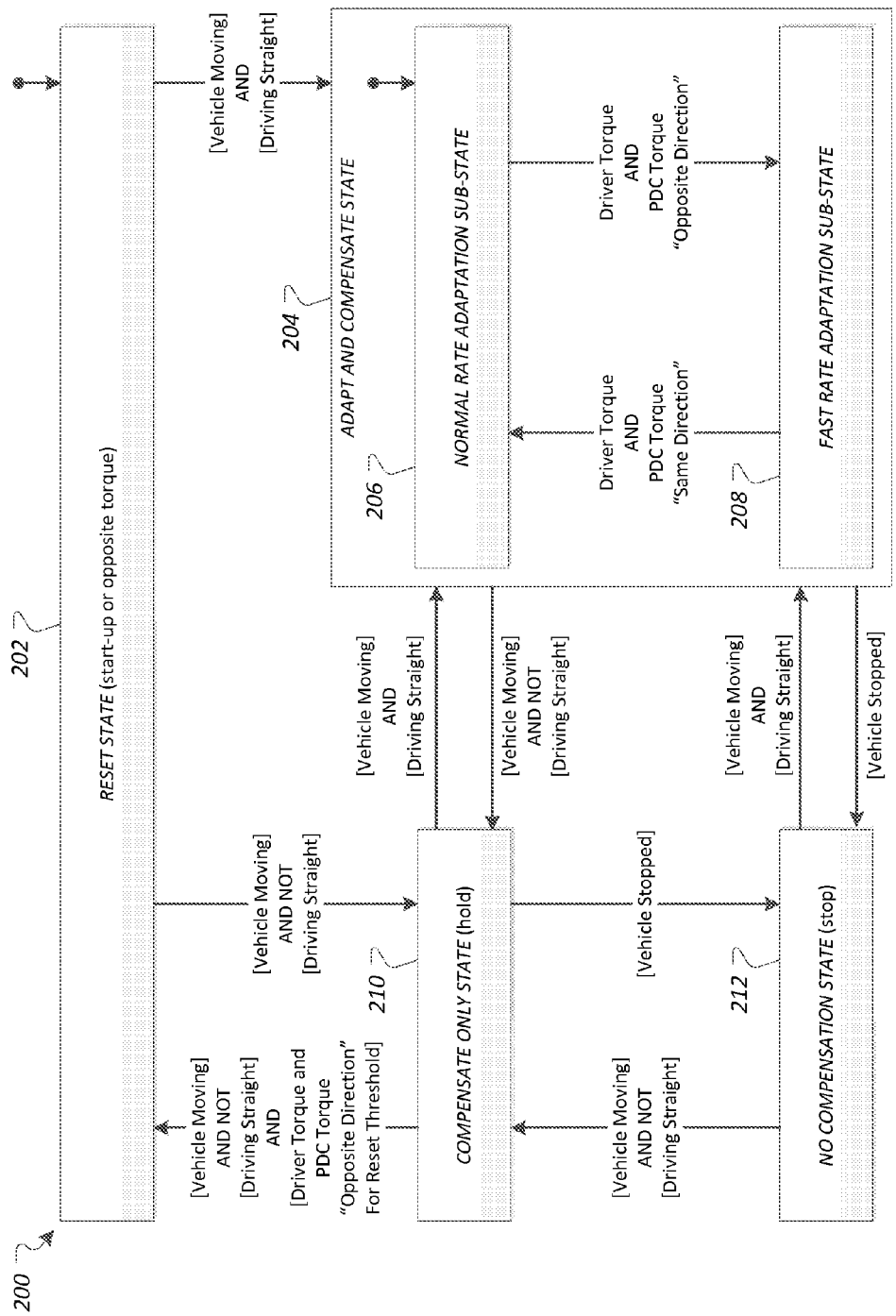
FIG. 2 illustrates an exemplary pull-drift compensation logic state transition diagram for implementing enhanced pull-drift compensation.

FIG. 2 illustrates an exemplary pull-drift compensation logic 122 state transition diagram 200 for implementing enhanced pull-drift compensation. The enhanced pull-drift compensation logic 122 may implement the state transition diagram 200 by way of the controller 118 to detect conditions in which the driver torque 104 opposes the learned pull-drift compensation torque 124, and to act accordingly to prevent driver discomfort.

The state transition diagram 200 may be initialized in reset state 202, which may occur upon vehicle start-up or in certain situations upon an indication by the pull-drift compensation logic 122 that pull-drift compensation torque 124 opposes driver torque 104 for a predetermined reset threshold period of time or distance. In the reset state 202, the pull-drift compensation logic 122 may reset pull-drift compensation torque 124 to a default compensation level such as zero, and the pull-drift compensation logic 122 may direct the controller 118 to neither learn nor apply pull-drift compensation torque 124. The pull-drift compensation logic 122 may cause the controller 118 to remain in the reset state 202, for example, while the vehicle is at rest. If the pull-drift compensation logic 122 determines that the vehicle begins to move in a substantially straight direction, then the pull-drift compensation logic 122 may transition to an adapt-and-compensate state 204. If the pull-drift compensation logic 122 determines that the vehicle begins to move in a non-straight direction, the pull-drift compensation logic 122 may transition to a compensate-only state 210.

In the adapt-and-compensate state 204, the pull-drift compensation logic 122 may learn pull-drift compensation torque 124 and apply learned pull-drift compensation torque 124 to the system 100. The pull-drift compensation torque 124 may be learned by the pull-drift compensation logic 122 by identifying a driver torque 104 moment consistently applied to the steering wheel 102 for a predetermined amount of time or distance. Once identified, the pull-drift compensation logic 122 may cause the controller 118 to signal the motor 114 to continue apply the learned amount of pull-drift compensation torque 124.

Importantly, the adapt-and-compensate state 204 may include two sub-states: a normal-rate adaptation sub-state 206 and a fast-rate adaptation sub-state 208. The pull-drift compensation logic 122 may initialize the adapt-and-compensate state 204 into the normal-rate adaptation sub-state 206, but may transition the adapt-and-compensate state 204 to the fast-rate adaptation sub-state 208 if the pull-drift compensation logic 122 determines that the driver torque 104 is in the opposite direction of or opposes the pull-drift compensation torque 124. Likewise, the pull-drift compensation logic 122 may transition the adapt-and-compensate state 204 from the fast-rate adaptation sub-state 208 to the normal-rate adaptation sub-state 206 if the pull-drift compensation logic 122 determines that the driver torque 104 is in the same direction as or no longer opposes the pull-drift compensation torque 124.

In the normal-rate adaptation sub-state 206, the pull-drift compensation logic 122 may use a relatively larger amount of time or distance to learn an amount of pull-drift compensation torque 124 to apply. However, in the fast-rate adaptation sub-state 208, the pull-drift compensation logic 122 may, as some examples, use a relatively shorter amount of time or distance to learn the amount of pull-drift compensation torque 124 to apply. For instance, the fast-rate adaptation sub-state 208 may utilize an amount of time or distance for learning that may be 3-4 times shorter than that used in the normal-rate adaptation sub-state 206. As another possibility, in some cases the fast-rate adaptation sub-state 208 may be enabled to perform larger adjustments to the pull-drift compensation torque 124 within a given period of time than allowed for in the normal-rate adaptation sub-state 206.

If, while in the adapt-and-compensate state 204, the vehicle continues to move but turns or discontinues movement in the substantially straight direction, the pull-drift compensation logic 122 may transition to the compensate-only state 210. Or, if the vehicle stops while in the adapt-andcompensate state 204, the pull-drift compensation logic 122 may transition to the no-compensation state 212.

In the compensate-only state 210, the pull-drift compensation logic 122 may not learn pull-drift compensation torque 124, but may still apply any learned pull-drift compensation torque 124 to the system 100. For example, the pull-drift compensation logic 122 may apply any pull-drift compensation torque 124 learned while in the adapt-and-compensate state 204 to the power steering system 100. If the pull-drift compensation logic 122 determines that the vehicle continues moving in a non-straight direction, and further that the driver torque 104 and the pull-drift compensation torque 124 remain opposed for a reset threshold amount of time or distance, then the pull-drift compensation logic 122 may transition to the reset state 202, as described above. This reset threshold to transition back to the reset state 202 may be a relatively longer timeout (for instance approximately five minutes), and may be used to in order to allow the system to allow for recovery from certain situations in which the pull-drift compensation torque 124 may potentially become difficult to be reduced in amount, such as where a steering position may be substantially off-center. Moreover, if the pull-drift compensation logic 122 determines that the vehicle discontinues or is no longer turning, and further determines that the driver torque 104 is in the same direction as or does not oppose the pull-drift compensation torque 124, then the pull-drift compensation logic 122 may transition to the adapt-and-compensate state 204, for example into the normal-rate adaptation sub-state 206 therein. If the vehicle stops while in the compensate-only state 210, the pull-drift compensation logic 122 may transition to the no-compensation state 212.

In the no-compensation state 212, the pull-drift compensation logic 122 may neither learn nor apply pull-drift compensation torque 124. However, in contrast to the reset state 202, in the no-compensation state 212 the pull-drift compensation logic 122 may still maintain memory of any learned pull-drift compensation torque 124. Thus, if the pull-drift compensation logic 122 determines that the vehicle begins to move in a substantially straight direction, then the pull-drift compensation logic 122 may transition into an adapt-and-compensate state 204 using any previously learned pull-drift compensation torque 124. If the pull-drift compensation logic 122 determines that the vehicle begins to move in a non-straight direction, the pull-drift compensation logic 122 may likewise transition to a compensate-only state 210 using any previously learned pull-drift compensation torque 124.

By using the enhanced pull-drift compensation as discussed above, a vehicle may be able to utilize pull-drift compensation while avoiding issues with the driver torque 104 opposing the pull-drift compensation torque 124. As a specific example, while driving in a substantially straight direction a driver may direct a vehicle over a road surface having a relatively large road crown that transitions into a road surface having a lesser road crown. While traversing the portion of road surface having a relatively large road crown, the pull-drift compensation logic 122 may learn an amount of pull-drift compensation torque 124 sufficient to avoid driver discomfort at the continued application of a driver torque 104 to maintain course. This amount of pull-drift compensation torque 124 may be learned, for example, in the normal-rate adaptation sub-state 206 of the adapt-and-compensate state 204 of the pull-drift compensation logic 122. Upon the vehicle transitioning to the road surface having a lesser road crown, the pull-drift compensation logic 122 may determines that the driver torque 104 opposes the pull-drift compensation torque 124, and may transition to the fast-rate adaptation sub-state 208. In the fast-rate adaptation sub-state 208, the pull-drift compensation logic 122 may quickly adjust the pull-drift compensation torque 124, thereby minimizing the period of unnatural opposition of the pull-drift compensation torque 124 with the driver torque 104, thereby avoiding driver complaints. When the driver torque 104 no longer opposes the pull-drift compensation torque 124, the pull-drift compensation logic 122 may transition back to the normal-rate adaptation sub-state 206 of the adapt-and-compensate state 204.

Computing devices such as the controller 118 generally include computer-executable instructions executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. An application configured to perform the operations of the controller 118, such as the pull-drift compensation logic 122 operations discussed in details above, may be one such computer program product and may be provided as hardware or firmware, or combinations of software, hardware and/or firmware.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A pull-drift compensation controller device for a vehicle configured to perform operations comprising:
   identifying a current pull-drift compensation torque and a current driver input torque while in an adapt-and-compensate state in which pull-drift compensation torque is learned and applied, wherein the vehicle is moving at a substantially straight heading; and
   performing a transition from a normal pull-drift compensation adjustment sub-state of the adapt-and-compensate state to a fast pull-drift compensation adjustment sub-state of the adapt-and-compensate state based on the current driver torque opposing the direction of the current pull-drift compensation torque without a change in the heading.

2. The pull-drift compensation controller device of claim 1, further configured to perform operations comprising:
   identifying an updated pull-drift compensation torque and an updated driver input torque; and
   performing a transition from the fast pull-drift compensation adjustment sub-state to the normal pull-drift compensation adjustment sub-state based on the updated driver torque no longer opposing the direction of the updated pull-drift compensation torque without a change in heading.

3. The pull-drift compensation controller device of claim 1, further configured to perform operations comprising at least one of:
   transitioning, when the vehicle is stopped, from the adapt-and-compensate state to a no-compensation state in which neither learning nor applying pull-drift compensation torque is performed; and
   transitioning, when the vehicle is moving but no longer driving substantially straight, from the adapt-and-compensate state to a compensate-only state in which applying pull-drift compensation torque is performed but not learning of pull-drift compensation torque.

4. The pull-drift compensation controller device of claim 1, further configured to perform operations comprising:
   detecting the vehicle initiating movement in a substantially straight direction while in the no-compensation state or the compensate-only state; and
   transitioning to the adapt-and-compensate state in the normal pull-drift compensation adjustment state based on the detection.

5. The pull-drift compensation controller device of claim 1, further configured to perform operations comprising:
   identifying an updated pull-drift compensation torque and an updated driver input torque continuing to oppose for a predetermined reset threshold; and
   performing, based on the updated driver torque continuing to oppose the direction of the updated pull-drift compensation torque for the predetermined reset threshold, a transition from the compensate-only state to a reset state in which the pull-drift compensation torque is reset to a default value and neither learning nor applying pull-drift compensation torque is performed.

6. The pull-drift compensation controller device of claim 1, further configured to perform operations comprising:
   detecting the vehicle initiating movement in a substantially straight direction while in the no-compensation state or the compensate-only state; and
   transitioning to the adapt-and-compensate state in the normal pull-drift compensation adjustment state based on the detection.

7. The pull-drift compensation controller device of claim 1, wherein the faster rate of pull-drift compensation learning includes at least one of a shorter predetermined distance to adjust the pull-drift compensation torque, a shorter amount of time to adjust the pull-drift compensation torque, and a larger adjustment to the pull-drift compensation torque being made within a time period than provided for in the normal-rate adaptation sub-state.

8. A method, comprising:
   identifying a current pull-drift compensation torque and a current driver input torque while in an adapt-and-compensate state in a vehicle moving at a substantially straight heading; and
   performing, by a pull-drift compensation controller, a transition from a normal pull-drift compensation adjustment sub-state of the adapt-and-compensate state to a fast pull-drift compensation adjustment sub-state based on the current driver torque opposing the direction of the current pull-drift compensation torque without a heading change.

9. The method of claim 8, further comprising:
   identifying an updated pull-drift compensation torque and an updated driver input torque; and
   performing a transition from the fast pull-drift compensation adjustment sub-state to the normal pull-drift compensation adjustment sub-state based on the updated driver torque no longer opposing the direction of the updated pull-drift compensation torque without a change in heading.

10. The method of claim 8, further comprising at least one of:
- transitioning, when the vehicle is stopped, from the adapt-and-compensate state to a no-compensation state in which neither learning nor applying pull-drift compensation torque is performed; and
- transitioning, when the vehicle is moving but no longer driving substantially straight, from the adapt-and-compensate state to a compensate-only state in which applying pull-drift compensation torque is performed but not learning of pull-drift compensation torque.

11. The method of claim 8, further comprising:
- detecting the vehicle initiating movement in a substantially straight direction while in the no-compensation state or the compensate-only state; and
- transitioning to the adapt-and-compensate state in the normal pull-drift compensation adjustment state based on the detection.

12. The method of claim 8, further comprising:
- identifying an updated pull-drift compensation torque and an updated driver input torque continuing to oppose for a predetermined reset threshold; and
- performing, based on the updated driver torque continuing to oppose the direction of the updated pull-drift compensation torque for the predetermined reset threshold, a transition from the compensate-only state to a reset state in which the pull-drift compensation torque is reset to a default value and neither learning nor applying pull-drift compensation torque is performed.

13. The method of claim 8, further comprising:
- detecting the vehicle initiating movement in a substantially straight direction while in the no-compensation state or the compensate-only state; and
- transitioning to the adapt-and-compensate state in the normal pull-drift compensation adjustment state based on the detection.

14. The method of claim 8, wherein the faster rate of pull-drift compensation learning includes at least one of a shorter predetermined distance to adjust the pull-drift compensation torque, a shorter amount of time to adjust the pull-drift compensation torque, and a larger adjustment to the pull-drift compensation torque being made within a time period than provided for in the normal-rate adaptation sub-state.

15. A pull-drift compensation controller device for a vehicle configured to perform operations comprising:
- identifying a pull-drift compensation torque and a driver input torque opposing for a predetermined reset threshold; and
- performing, based on the pull-drift compensation torque and a driver input torque opposing for the predetermined reset threshold, a transition from a compensate-only state in which pull-drift compensation torque is applied but not learned to a reset state in which the pull-drift compensation torque is reset to a default value and neither learning nor applying pull-drift compensation torque is performed.

16. The pull-drift compensation controller device of claim 15, wherein the predetermined reset threshold includes at least one of a predetermined amount of time and a predetermined distance of travel.

17. The pull-drift compensation controller device of claim 15, further configured to perform operations comprising at least one of:
- transitioning from the reset state to an adapt-and-compensate state in which pull-drift compensation torque is learned and applied based on determining that the vehicle is moving in a substantially straight direction; and
- transitioning from the reset state to the compensate-only state based on determining that the vehicle is moving in a non-straight direction.

18. The pull-drift compensation controller device of claim 17, further comprising:
- identifying a current pull-drift compensation torque and a current driver input torque while in the adapt-and-compensate state, wherein the vehicle is moving at a substantially straight heading; and
- performing a transition from a normal pull-drift compensation adjustment sub-state of the adapt-and-compensate state to a fast pull-drift compensation adjustment sub-state of the adapt-and-compensate state based on the current driver torque opposing the direction of the current pull-drift compensation torque without a change in the heading.

* * * * *